3,161,690
SEPARATION PROCESS
Frank T. Eggertsen, Orinda, Calif., assignor to Shell
Oil Company, a corporation of Delaware
No Drawing. Filed June 9, 1958, Ser. No. 740,540
4 Claims. (Cl. 260—666)

This invention relates to a process for separating organic compounds from others of substantially different molecular weight. More particularly the invention is concerned with a process in which organic compounds are separated from others of equal polarity but different molecular weight by contact with zeolitic molecular sieve sorbents of the faujasite type.

In industries dealing with organic chemicals and hydrocarbons it frequently occurs that close-boiling mixtures of compounds having very similar chemical characteristics are formed which are impossible to separate into their components by commercial fractional distillation or other practical processes. This invention provides a practical means for concentrating components from such mixtures or for recovering components in pure form, provided the compounds differ in molecular weight by at least ten units. This invention is particularly advantageous for separating close-boiling hydrocarbon fractions containing compounds differing by one carbon number into constituents of higher and lower carbon number. An otherwise very difficult separation which is readily carried out according to the process of this invention is the recovery of cyclohexane of 100% purity from cyclohexane concentrates containing substantial concentrations of dimethylpentanes.

It is well known that certain zeolites having rigid three-dimensional anionic networks with intracrystalline interstitial channels whose narrowest cross section has essentially a uniform diameter, e.g., in the range from three to thirteen Angstrom units, have the characteristic of selectively sorbing compounds in whose molecules the maximum dimension of the minimum projected cross section is not substantially larger than said channel diameter, while rejecting larger molecules. These zeolites are known as "molecular sieves" and the intracrystalline channels are known as "pores." The process of this invention is concerned with the use of a particular group of such molecular sieves, known as faujasites. Both natural and synthetic faujasites are well known and are useful in this process.

Natural faujasite is a crystalline zeolite which occurs in nature. Its composition can be represented as a mixture of the oxides of calcium, sodium, aluminum and silicon. Typical samples that have been analyzed have the following compositions, expressed in mole ratios of oxides present:

|  | I | II | III |
|---|---|---|---|
| Calcium oxide | 0.54 | 0.51 | 0.41 |
| Sodium oxide | 0.43 | 0.49 | 0.58 |
| Aluminum oxide | 1.00 | 1.00 | 1.00 |
| Silicon oxide | 5.00 | 4.65 | 4.54 |

The mole ratio of the sum of the calcium oxide and sodium oxide to alumina varies as follows:

$$\frac{CaO + Na_2O}{Al_2O_3} = 1.0 \pm 0.1$$

The mole ratio of silica to alumina lies within the following range:

$$1 \pm 0.1 M_2O : 1 Al_2O_3 : 4.75 \pm 0.25 SiO_2 : Y H_2O$$
$$n$$

In the above formula, "M" is one or a number of cations having a valence of not more than three and "n" is the valence state of the cation. Y may be any value up to about 8.

Before faujasite may be used in the process of the invention, at least a part of its adsorbed water must be removed. This can be done by heating the faujasite to drive off the water. Heating the faujasite to temperatures of about 250° C. has given excellent results. Faujasite can be dehydrated by heating to less than about 700° C. without destroying the crystal structure.

Recently certain synthetic faujasites have become commercially available from Linde Company, a division of Union Carbide Corporation. The synthetic faujasites are designated by Linde as "X-type." Their preparation and characteristics are discussed in detail in French Patent No. 1,117,756 to Union Carbide and Carbon Corporation. The general formula for the synthetic faujasites is $$(0.9 \pm 0.2) M_2O : Al_2O_3 : (2.5 \pm 0.5) SiO_2 : Y H_2O$$
$$n$$

In this formula M represents a metal, $n$, its valence and Y may be any value up to 8, depending on the identity of the metal and the degree of hydration of the crystal. The pores of freshly prepared synthetic zeolite X are filled with water and the crystal is activated prior to use by dehydration at temperatures up to 700° C.

The uniform pore diameter of faujasites is generally in the range between ten and thirteen Angstroms, depending on the particular metal which is present in the structure, but may be larger or smaller. It is known that the faujasites generally sorb molecules having a maximum dimension of the minimum projected cross section that is smaller than that of heptacosafluorotributylamine $(C_4F_9)_3N$ and will not accept or sorb larger molecules. It is also known that the faujasites will preferentially sorb more polar molecules when in contact with a mixture of molecules of different polarity. The process of this invention is not based on either of these known characteristics of faujasites. It has now been found that faujasites have an additional, previously unsuspected characteristic in permitting the separation of molecules of about the same degree of polarity. It has been found that an easy separation can be made by passing a mixture of compounds of approximately equal polarity and differing substantially in molecular weight through a contact mass of faujasite whose pore diameter is larger than the maximum dimension of the minimum projected cross section of the components of the mixture, with the result that the compound having the lower molecular weight passes through the contact mass while the compound of higher molecular weight is detained within the contact mass for a substantially longer period of time.

In the particular application of this invention in which a mixture of cyclohexane and dimethylpentanes is passed through a contact mass of faujasite, cyclohexane is recovered in substantially pure form while dimethylpentanes are held back in the contact mass. In this instance the compound having a slightly higher polarity passes through the contact mass while compounds of slightly lower polarity are held back in the faujasite. This is the opposite of the known characteristic of faujasite when it is contacted with materials differing substantially in polarity, in which case the more polar compound is the one that is held.

The process of this invention is preferably carried out in vapor phase. Temperatures during the sorption step may be in the range from 100° to 600° C. and are preferably in the range from 200° to 400° C. Temperatures during the desorption step may be in the same range.

The process is suitably carried out at atmospheric pressure. It may also be carried out at subatmospheric pressures or at pressures up to 100 p.s.i.g. or higher.

In processing a feed fraction in accordance with this invention, a convenient method comprises:

(1) Establishing a bed of faujasite in a vessel, such as a tube or tower, which may be provided with heating means such as a jacket or internal coils;

(2) Passing feed through the bed while maintaining the desired bed temperature;

(3) Passing the effluent, which at first contains the lower molecular weight compound in higher concentration or in absolute purity, to a recovery means; this may be, for example, a condenser or an absorber with the usual associated equipment;

(4) Discontinuing flow of feed to the bed after an amount has been charged which is sufficient to substantially exhaust the capacity of the faujasite contact mass to resolve additional portions of feed mixture;

(5) Eluting the components remaining absorbed in the contact mass by any desired means; and (6) After the remaining components have been removed from the bed, at least to the extent to which they are readily desorbed at the prevailing conditions, adding fresh feed and repeating the cycle.

The amount of feed to be charged during the sorption step of each cycle is preferably no more than can be substantially completely resolved into separate components. It is generally in the range from one to five parts by weight of feed mixture per 100 parts of faujasite. This capacity can be readily determined for a given feed mixture and desired set of conditions by charging at first a small amount of feed, e.g. one part per 100. This should be completely resolved into the desired components. As progressively larger amounts are charged in each cycle, a condition is reached at which the high molecular weight component begins to emerge before the low molecular weight component has been recovered to the desired extent. A small amount of overlap may sometimes be allowed to permit operation at relatively higher total throughput per unit time. The amount of feed to be charged per cycle can thus be readily determined, either in the commercial unit or on a laboratory scale.

The removal of the material remaining in the sorbent bed after flow of feed has been discontinued is suitably carried out by passing a substantial flow of an inert gas through the contact mass to sweep out the remaining compounds. Helium, hydrogen, nitrogen and methane have been successfully used as such sweep gases. Other inert gases, i.e. gases which do not react with either the sorbent, the vessel or the reactants are also suitable. For example, argon, flue gas (preferably scrubbed to remove reactive impurities), propane and other gases and vapors can be used as sweep gas.

During the feed contacting step, feed may be added to the heated sorbent as a liquid, to be quickly vaporized by contact with sorbent, or it may be added as a vapor. If desired, flow of inert gas may be maintained through the sorbent mass at all times and feed added as liquid or as vapor to the inert gas. It will generally be preferred to maintain a relatively low rate of inert gas flow or no gas flow at all during the time when feed is added and a substantial gas flow during the time when sorbed components are desorbed.

The preferred feeds of this invention contain compounds of approximately equal polarity and differing in molecular weight by at least 10 and preferably in carbon number by one carbon atom per molecule.

A preferred feed is a saturated hydrocarbon fraction consisting of cyclohexane and at least one dimethylpentane. The cyclohexane fraction preferably is a concentrate containing a major proportion and more preferably at least about 80% cyclohexane. It generally boils between 75° and 85° C.

Another suitable feed is a cyclopentane concentrate containing a major proportion of cyclopentane together with a close-boiling dimethylbutane. Such a fraction may boil in the range from 45° to 60° C. Cyclopentane and 2,2-dimethylbutane both boil at approximately 50° C. and are not separable by commercial fractional distillation. They are easily separated according to the process of this invention.

In the above-mentioned cases the carbon number of all the paraffins present in the feed is generally higher than that of the naphthenes. However, since the normal paraffin of the same carbon number as the naphthene boils at a temperature close to the lower limit of the specified ranges, it may be found in feed mixtures which have a cut point close to the lower limit. In such cases it is practical to subject the feed, prior to the faujasite-contacting step, to contact with a five Angstrom molecular sieve, which selectively adsorbs only the normal paraffin hydrocarbon. The effluent from the five Angstrom sieve is then suitable to be charged to the faujasite contact for separation of the naphthene from the higher molecular weight paraffins. Feeds amenable to such combination treatment are especially those boiling from 35° to 70° C., 65° to 85° C. and 95° to 105° C.

Another feed which cannot be separated by a practical fractional distillation but which is readily amenable to separation according to this invention is a mixture of n-heptane and 2,2,4-trimethylpentane ("isooctane"). The pure compounds boil at about 98.5° and 99.3° C., respectively.

In general, the boiling point of paraffins of a given carbon number decreases with increased branchiness. Hence, in the $C_6$ to $C_9$ range which is of interest for gasoline, the lowest octane number components of a given carbon number having boiling points very close to the highest octane number components of the next higher carbon number. Suitable feeds for separation into low and high octane number components are highly paraffinic fractions boiling between about 60° and 85° C., 90° and 110° C., and 115° and 125° C.

Where it is not desired to separate certain specific compounds but where feed mixtures are to be resolved merely into fractions differing in carbon number, a feed fraction of relatively broad boiling range may be passed through faujasite. The effluent is resolved easily into fractions differing by carbon number, the lowest carbon number fraction being first to appear in the effluent followed by fractions of increasingly higher carbon number. Feed stocks suitable for such separations are those containing compounds of approximately equal polarity, e.g. feeds consisting only of aromatic hydrocarbons or only of olefinic hydrocarbons or only of naphthenes and paraffins. Such feeds may have boiling ranges as broad as 100° C.

This invention is not limited to the separation of hydrocarbons, although it has particular utility in that field. Other suitable feeds are mixtures of organic compounds of approximately equal polarity and differing substantially in molecular weight, e.g. by at least about 10. The feeds may be alcohols, ketones, aldehydes, halohydrocarbon, and the like.

If the feed in the above-described separations contains a compound of substantially greater polarity than compounds to be separated, the compound of greater polarity will be adsorbed more strongly and will be the last to be eluted from the sorbent bed. Thus it will not interfere with the desired separations.

The following examples illustrate some aspects of the invention but are not to be considered a limitation thereof:

Example I

A sample of Linde 10–X molecular sieve was crushed and screen-graded and the 20–40 mesh portion was calcined at 525° C. and stored for use. A column was packed with the 20–40 mesh portion, slowly heated to 450° C. in a stream of inert gas to remove any moisture which might be present, and cooled to operating temperature. In a series of experiments samples of pure hydrocarbons were individually injected into the column while inert gas was passing through. The molecular sieve in each case retarded the passage of the hydrocarbon through the column. The concentration of hydrocarbon in the effluent was measured. The time interval between the appearance in the effluent of small amounts of air admitted with the hydrocarbon and the observation of the maximum concentration of hydrocarbon in the effluent was designated the "emergence time." The emergence time is characteristic of the degree to which passage of the hydrocarbon through the column was delayed. In a series of experiments carried out at 325° C. the emergence time for cyclopentane was about 1.6 minutes and those for the five isomeric paraffins and for methylcyclopentane were between 3.5 and 7 minutes. In a further series at 350° C. the emergence time of cyclopentane was slightly more than 1 minute, the emergence time of the five isomeric $C_6$ paraffins and methylcyclopentane between 3 and 5 minutes.

These data indicated that if a mixture of cyclopentane and one or more saturated $C_6$ hydrocarbon is passed into a bed of 10–X molecular sieve, the cyclopentane is recovered as a separate fraction, ahead of the $C_6$ hydrocarbons.

Example II

A portion of Linde 13–X molecular sieve was crushed and screen-graded and a column packed with part of the 20–40 mesh portion. This was dried in a stream of inert gas at 450° C. for 20 minutes before measuring the emergence time of a series of hydrocarbons in the manner similar to that described in Example I. The following emergence times were found in experiments carried out at 325° C.: i-pentane, n-pentane, and cyclopentane—between 1.5 and 1.8 minutes; five hexane isomers, methylcyclopentane and cyclohexane—between 4.2 and 5.2 minutes; seven heptane isomers and methylcyclohexane—between 11 and 13.5 minutes.

These data indicate that excellent separations by carbon number are obtainable between components of saturated hydrocarbon mixtures by passing them through 13–X molecular sieve.

Example III

A column was filled with 100 parts by weight of powdered 13–X molecular sieve. Inert gas flow through the column was established at a rate of 26.7 volumes per volume of packed space per minute. A feed mixture consisting of 67% by volume cyclohexane and 33% by volume 2,4-dimethylpentane, having a boiling point of about 81° C., was charged to the column, which was maintained at a temperature of 400° C., until about five parts by weight of feed per 100 parts of adsorbent had been charged. The effluent from the column consisted at first of substantially pure cyclohexane. About 3.3 parts by weight of cyclohexane concentrate were recovered, followed by about 1.7 parts by weight of 2,4-dimethylpentane concentrate.

Example IV

In an experiment similar to that described in Example III, a feed consisting of 67% by volume n-heptane and 33% by volume 2,2,4-trimethylpentane and boiling between 98° and 100° C. was charged to the same column, which was maintained at a temperature of 400° C. Five parts by weight of feed per 100 parts of molecular sieve were charged. At first there were recovered about 3.3 parts by weight of n-heptane concentrate, followed by about 1.7 parts by weight of 2,2,4-trimethylpentane concentrate.

Example V

A column containing 100 parts by weight of 10–X molecular sieve was used in a series of runs in which a feed containing about 85% cyclohexane and 15% 2,4-dimethylbutane was passed through the column together with an inert sweep gas.

At a sweep gas rate of about 25 v./v./min., about one part by weight of feed was charged during a brief interval. All of the cyclohexane charged was recovered in 100% purity during a period of 12 minutes, and the 2,4-dimethylbutane was recovered in 100% purity during the following 30 minutes.

On increasing the amount charged to about 2⅓ parts by weight, the cyclohexane was still recovered completely at 100% purity. This process was repeated cyclically, at an overall mass velocity of 0.04 w./w./hr.

On increasing the amount charged to about 3⅓ parts by weight, the purity of the recovered cyclohexane dropped below 100%.

Complete recovery of 100% pure cyclohexane could be achieved at overall mass velocities up to 0.4 w./w./hr. by increasing the rate of sweep gas flow, thus increasing the speed of elution.

Increasing the temperature to 350° and 375° C. permitted equally good recoveries at somewhat lower gas flow rates.

Even better results were obtained in runs carried out at similar conditions over 13–X molecular sieve.

Example VI

A natural gasoline containing saturated hydrocarbons having from four to seven carbon atoms per molecule was passed through a column containing 13–X molecular sieve which had been pretreated with inert gas for one-half hour at 450° C. and which was maintained during the experiment at 300° C. 0.75 part by weight of the natural gasoline fraction was passed through the column per 100 parts by weight of molecular sieve. Successive cuts recovered from the column contained the $C_4$ hydrocarbons, the $C_5$ hydrocarbons, the $C_6$ hydrocarbons and the $C_7$ hydrocarbons, each cut being substantially uncontaminated with hydrocarbons of different carbon number.

Example VII

The emergence time of hexene-1 and cyclohexene was determined in a manner similar to Example II using a 13–X molecular sieve dried at 450° C. and operating at 325° C. The emergence times were between 10 and 11.5 minutes. This compares with an emergence time of saturated $C_6$ hydrocarbons in the same experiment of between 3 and 4 minutes, and of saturated $C_7$ hydrocarbons of between 8 and 10 minutes. When a mixture containing saturated and olefinic hydrocarbon of six and seven carbon atoms per molecule is passed through a column of 13–X molecular sieve, therefore, the first to emerge are the saturated $C_6$ hydrocarbons, next the saturated $C_7$ hydrocarbons, next the unsaturated $C_6$ hydrocarbons and next the unsaturated $C_7$ hydrocarbons.

When a mixture containing only monolefinic hydrocarbons of from five to eight carbon atoms per molecule is passed through a column of 13–X molecular sieve, olefins of individual carbon numbers are resolved as separate fractions substantially uncontaminated by olefins of a different carbon number.

I claim as my invention:

1. A process for the separation of hydrocarbon compounds of approximately equal polarity and differing in molecular weight by at least 10, which comprises passing a mixture containing such compounds and boiling within a temperature range not exceeding about 100° C. in breadth through a mass of molecular sieve sorbent having the crystal structure of faujasite having a pore size of about thirteen Angstrom units diameter, whose uniform pore diameter is larger than the maximum dimension of the minimum projected cross section of said hydrocarbon compounds and recovering an effluent containing the lower molecular weight component of the mixture in increased concentration.

2. A process for the separation of components of a saturated hydrocarbon mixture boiling within the gasoline boiling range and over a temperature range not exceeding about 100° C. in breadth and consisting of molecules differing in carbon number by one carbon atom per molecule which comprises passing the mixture through a mass of molecular sieve sorbent having the crystal structure of faujasite and having a pore diameter of about thirteen Angstrom units, recovering a pure fraction of the lower carbon number component of said mixture, discontinuing passage of additional mixture to the sorbent mass after an amount has been charged which is sufficient to substantially exhaust the capacity of the sorbent to resolve additional portions of said mixture, and thereafter desorbing said higher carbon number fraction from said sorbent mass.

3. A process for the separation of cyclopentane from a saturated hydrocarbon fraction boiling within the range of from about 45 to 60° C. which comprises passing the fraction through a mass of molecular sieve sorbent having the crystal structure of faujasite having a pore size of about thirteen Angstrom units, recovering as effluent substantially pure cyclopentane, discontinuing passage of additional mixture to the sorbent mass after an amount has been charged which is sufficient to substantially exhaust the capacity of the sorbent to resolve additional portions of the fraction, and thereafter desorbing the remaining hydrocarbons from said mass.

4. A process for the separation of a cycloaliphatic hydrocarbon from a branched acyclic hydrocarbon having one more carbon atom per molecule and the same degree of saturation, said hydrocarbons boiling within the gasoline boiling range, which comprises passing the mixture through a mass of molecular sieve sorbent having the crystal structure of faujasite, and which is a Type X synthetic zeolite having a pore size of about thirteen Angstrom units diameter, recovering as effluent said cycloaliphatic hydrocarbon, discontinuing passage of additional mixture to the sorbent mass after an amount has been charged which is sufficient to substantially exhaust the capacity of the sorbent to resolve additional portions of said mixture and thereafter desorbing the remaining hydrocarbons from said sorbent mass.

References Cited in the file of this patent
UNITED STATES PATENTS
2,882,244    Milton _____ Apr. 14, 1959

OTHER REFERENCES
Linde Company, Form 9947, published Aug. 19, 1957 (2 pp.).